United States Patent

[11] 3,603,800

[72] Inventors Jesus de Andres
  Yverdon Vaud;
  Giovanni Odone, La Rosiaz, Lausanne
  Vaud, both of, Switzerland
[21] Appl. No. 857,812
[22] Filed Sept. 15, 1969
[45] Patented Sept. 7, 1971
[73] Assignee Paillard S.A.
  Vaud, Switzerland
[32] Priority Sept. 26, 1968
[33] Switzerland
[31] 14402/68

[54] TELEMETER HAVING IMAGE FLUX SEPARATOR WITH OPAQUE AREA AT AN ACUTE ANGLE WITH THE OPTICAL AXIS
10 Claims, 6 Drawing Figs.

[52] U.S. Cl. .................................................. 250/220, 250/237
[51] Int. Cl. .................................................. H01j 3/14, H01j 5/16, H01j 39/12
[50] Field of Search .................................. 250/208, 209, 210, 220, 237

[56] References Cited
UNITED STATES PATENTS
3,320,850  5/1967  Oliver .................. 250/220

Primary Examiner—James W. Lawrence
Assistant Examiner—T. N. Grigsby
Attorneys—Emory L. Groff and Emory L. Groff, Jr.

ABSTRACT: The invention provides a high sensitivity in a telemeter of the type including a convergent optical receiving system reflecting the rays from the object the range of which is to be ascertained and two different photocells the exposure of which to said rays varies in opposite directions in accordance with the location of the point of convergence of said rays and to this end there is provided an element separating the rays impinging on the group of photocells and extending along a straight line passing through a predetermined point of convergence between two ranges of points of convergence for which the photocells are selectively predominant.

TELEMETER HAVING IMAGE FLUX SEPARATOR WITH OPAQUE AREA AT AN ACUTE ANGLE WITH THE OPTICAL AXIS

The present invention relates to a telemeter chiefly intended for photographic purposes, of the type including a convergent optical receiving system and at least two photoelectric elements exposed to the light rays received by the optical system and produced by the object the range of which is to be ascertained, said photoelectric elements being located in a manner such that their exposure varies in a reverse ratio with reference to each other in accordance with the distance at which said rays converge.

In order to obtain a proper sensitivity for the telemeter it is necessary to measure with a high accuracy the distance at which the rays collected by the receiving optical system converge. The U.S. Pat. application Ser. NO. 686,554 relates to a telemeter of said type which allows an excellent accuracy of measurement, but which includes intricate and expensive means defining the distance of convergence.

The present invention has for its object to solve simply, economically and efficiently the problem of the measurement of the distance of convergence in such a telemeter. This result is achieved by means of at least one separating element which is at least partly opaque and has an edge arranged so as to form a separating line between the loci of convergence of said rays for two distances of convergence which are near one another, said separating element being substantially flat and forming an angle less than 90° with the optical axis of the receiving system.

The accompanying drawings illustrate diagrammatically and by way of example various embodiments of said improved telemeter. In said drawings.

Figure 1:
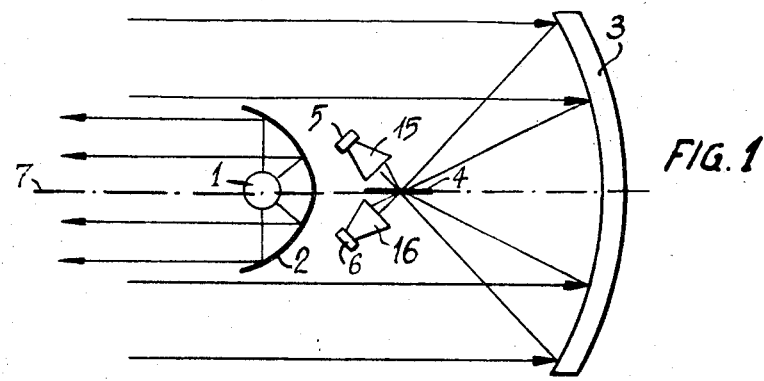
FIG. 1 is a partial view of a first embodiment of the telemeter.

FIG. 1 illustrates the principle of the optical operation of a telemeter including a lamp 1, a reflector 2 projecting the luminous rays produced by the lamp 1 towards the object the distance of which is to be ascertained, a convergent optical receiving system 3 including the two terminal fractions of a diametrical strip forming part of a concave mirror, said receiving system being adapted to collect the rays issuing from the object. A blade 4 provided with reflecting surfaces constitutes a flat mirror extending along the optical axis 7 and two photoelectric elements 5 and 6 provided with light guiding means, 15 and 16 respectively are located to either side of said optical axis.

The luminous rays produced by the lamp 1 are reflected by the reflector 2 and directed as a beam of rays parallel with the optical axis 7 of the reflector 2 towards the object of which it is desired to measure the distance. A fraction of the rays reflected by said object impinges onto the convergent optical system 3, the optical axis of which registers with that of the reflector 2, said fraction reaching the opposite reflecting sides of the blade 4 forming a separating element and directing said rays towards the photocells 5 and 6.

Figure 2:
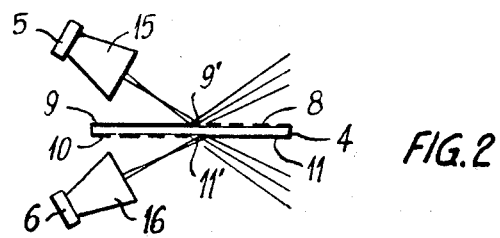
FIG. 2 shows on a larger scale a detail of FIG. 1.

FIG. 2 illustrates a detail of the blade 4 which the reflecting areas include an aluminum coated part 9 on one surface of the blade 4, the other area 8 of said surface being black. The opposite surface of said blade 4 is provided with a reflecting area 11 registering with the black area 8 of the first-mentioned surface and a black area 10 in registry with the reflecting area 9 of said first-mentioned surface. Each reflecting area 9 or 11 is separated from the cooperating area, 10 or 8 respectively, by a rectilinear edge, 9' or 11' respectively, forming a separating line between the loci of convergence of said rays for two adjacent ranges of convergence.

When the object considered moves, for instance when it moves away from the measuring apparatus, the point of convergence of the rays moves towards the right-hand side of FIG. 2. The luminous beam reflected by the fraction of the concave mirror 3 extending underneath the optical axis impinges gradually more on the black absorbent area 8 while the luminous bema reflected by the opposite fraction of the mirror impinges gradually more onto the reflecting area 11.

There is thus obtained a reduction in the illumination of the photocell 5 and an increase in that of the photocell 6. Obviously, if the point of convergence of the collected rays moves towards the left-hand side of FIG. 2 over the blade 4 the conditions of illumination of the elements 5 and 6 are reversed.

The photocells 5 and 6 which are preferably photoconductive are inserted in an electric circuit which is not illustrated, for instance of the type disclosed in the U.S. Pat. application referred to hereinabove Ser. No. 686,554 so as to supply at least one electric signal controlling an auxiliary mechanism adapted to shift the blade 4 in its plane until the cooperating rectilinear edges of the reflecting areas 9 and 11 register with the point of convergence of the rays reflected by the concave mirror 3.

Figure 3:
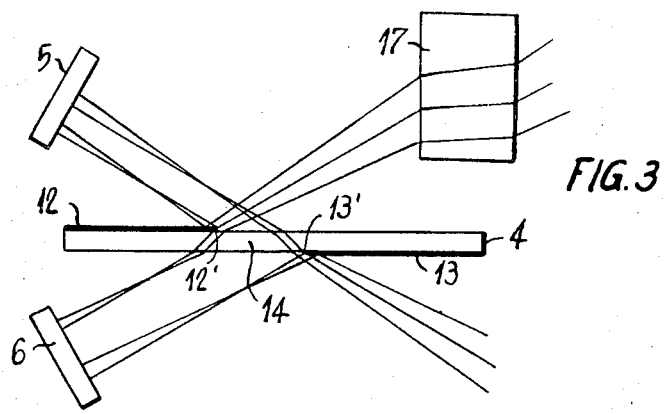
FIG. 3 illustrates a detail of a modification including a ray deflecting element.

FIG. 3 illustrates a modification of the blade 4 which includes a two reflecting areas 12 and 13 located substantially in a plane passing through the optical axis 7 or very near said plane and separated by a transparent area 14. The limit between the transparent area 14 and each reflecting surface 12 or 13 is constituted by a rectilinear edge 12' or 13' respectively. The convergent optical system is designed in a manner such that the foci of its two fractions are spaced along the optical axis 7 by a distance equal to that separating the two rectilinear lines 12' and 13'. Said spacing is obtained by a transparent block 17 inserted in the path of the convergent beam passing off one fraction of the system 3. Said block 17 may be made of glass or of plastic material.

When the convergent rays move towards the right-hand side of the blade 4 to either side of the latter, in direct relationship for instance with the movement of the object away from the blade 4, said rays issuing from the lower fraction of the optical system and reaching the area 13 are deflected to an increasing extent towards the photocell 6 while the rays of the beam from the upper fraction of the optical system move gradually away from the reflecting area 12 so as to impinge onto the transparent area 14 and to reach a gradually lesser extent the photocell 6 whereby a difference in illumination between the photocells 5 and 6 is obtained.

Figure 4:
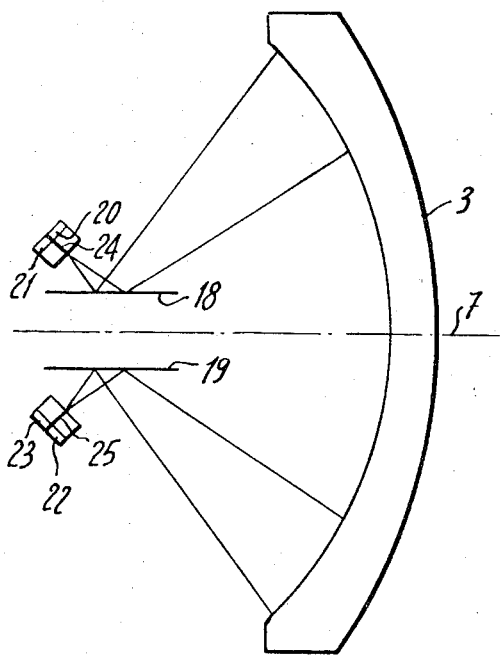
FIG. 4 illustrates a second embodiment showing uniform reflecting blades.

In the embodiment illustrated in FIG. 4, the telemeter includes two mirrors 18 and 19 arranged in parallelism to either side of the optical axis 7 of the optical receiving system 3 which is constituted by a diametrical strip cut out of a concave mirror. Each of said mirror 18, 19 reflects the rays received from the concave mirror 3 towards a group of two photocells 20, 21 and 22, 23 respectively, The two photocells of each group are associated with a blade 24 or 25 respectively, the plane of which is set so as to be substantially parallel with the general direction of the rays reflected towards the group of photocells considered. Both surfaces of said blades form reflecting areas and the rectilinear edge of each blade, which is nearest the optical system, lies in proximity with the point of convergence of said rays. Thus, when the point of convergence to one side of the optical axis registers with the corresponding rectilinear edge, the two photocells of the associated group of photocells are illuminated equally.

When the distance at which the rays converge increases, the point of convergence of the rays moves outwardly with reference to the rectilinear edge so that the photocells 21 and 23 receive more light than the photocells 20 and 22, If, in contradiction, the distance of convergence decreases, the conditions of illumination of the photocells would be reversed.

It should be noted that the blades 24 and 25 forming separating elements are not necessarily of a reflecting type. As a matter of fact, the parts of said blades adjacent the rectilinear edges cut off the rays which would otherwise impinge on one of the photocells as soon as the point of convergence of the rays no longer registers exactly with said rectilinear edge. However, when the surfaces of the said blades are of a reflecting character, the rays which have been cut off and no longer reach one photocell are reflected towards the other photocell which reinforces the effect due to the lack of balance between the illuminations provided for the two photocells. This still further increases the sensitivity of the arrangement.

Figure 5:
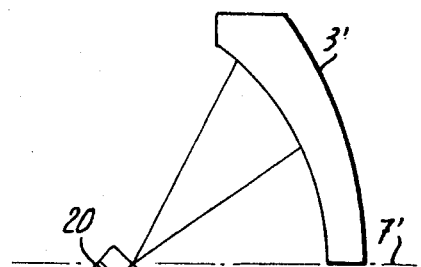
FIG. 5 shows another embodiment without any reflecting blades.

FIG. 5 illustrates another embodiment similar to that of FIG. 4 except for the fact that the two plane mirrors 18 and 19 are eliminated. In order to produce two separate points of convergence for the rays reflected by the two fractions 3' and 3'' of the reflecting system, the latter includes two independent portions forming parts of a concave mirror, each portion being provided with its own optical axis 7' or 7''. It is thus possible to make the rectilinear edge of the separating areas 24 and 25 of each group of two photocells lie on the corresponding optical axes 7 and 7' respectively.

The operation of said telemeter is exactly similar to that disclosed with reference to FIG. 4 when the point of convergence of the rays reflected by the optical reflecting system is shifted along the optical axes.

Figure 6:
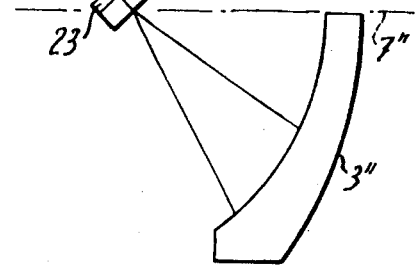
FIG. 6 illustrates another embodiment without any reflecting blades but with a ray deflecting element.
Figure 6:
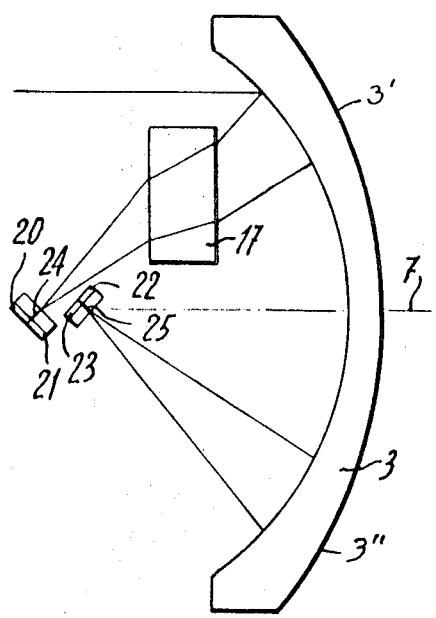

FIG. 6 illustrates a modification wherein the two groups of photocells 20 and 21, and 22 and 23 are located along the optical axis 7 of an optical system 3 constituted by a diametrical strip cut out of a concave mirror. The two active portions 3' and 3'' of the reflecting system reflect rays towards the corresponding groups of two photocells and, in order to make each of said groups sensitive to the rays issuing out of only one of said active reflecting portions, the distance of convergence of the rays from the portion 3' is increased optically by a transparent block 17 with parallel surfaces made of glass or plastic material. Thus the two groups of photocells may be located one behind the other along the same optical axis, the block 17 being inserted across the path of the rays impinging onto the group of photocells furthest away from the concave mirror.

We claim:

1. In a telemeter for measuring the distance of an object, particularly for use in photography, comprising projector means for directing a light beam to an object whose distance is to be measured, a convergent optical receiving system capable of forming an image of the portion of the object lighted by the light beam, with the impinge formed by said convergent optical system being shifted parallel to itself along the optical axis of said optical receiving system depending upon the distance of the object from said optical receiving system, a detector device comprising at least one separator element for separating the luminous flux forming the image into two separate beams with the proportion of the luminous fluxes forming the two means being dependent on the position of said image with respect to that of said separator element, and at least one pair of photocells measuring and comparing the intensity of the luminous fluxes of the two beams, the improvement wherein said separator element comprises at least one opaque area forming an angle of less than 90° with the axis of the optical convergent system and having an edge located at least neat the point of convergence of the image.

2. In a telemeter as claimed in claim 1, wherein each separator element comprises a blade to either side of which the photocells of the corresponding pair of photocells are set, said blade extending in substantial parallelism with the reflected rays impinging on said photocells.

3. In a telemeter as claimed in claim 1, the further improvement wherein the convergent optical receiving system includes two separate reflecting fractions adapted to reflect separate portions of the light issuing from the object, the optical axes of said fractions extending in parallelism with a predetermined direction.

4. In a telemeter as claimed in claim 1, the further improvement wherein the convergent optical receiving system includes two separate reflecting fractions adapted to reflect separate portions of the light issuing from the object, the optical axes of said fractions extending in parallelism with a predetermined direction, each separator element comprising a blade to either side of which the photocells of the corresponding pair of photocells are set, said blade extending in substantial parallelism with the reflected rays impinging on said photocells, and reflected by the corresponding fraction of the optical system.

5. In a telemeter as claimed in claim 1, the further improvement wherein the convergent optical receiving system includes the terminal reflecting fractions of a diametrical strip cut out geometrically of a concave mirror, said telemeter including furthermore two parallel plane mirrors located to either side of the optical axis of the concave mirror and adapted to reflect the rays of the convergent beam reflected by the corresponding terminal reflecting fractions onto the corresponding pair of photocells, each separator element comprising a blade to either side of which the photocells of the corresponding pair of photocells are set, said blade extending in substantially parallelism with the reflected rays impinging on said photocells.

6. In a telemeter as claimed in claim 1, the further improvement wherein the convergent optical receiving system includes two marginal fractions formed in concave mirrors the axes of which are parallel and spaced with reference to each other.

7. In a telemeter as claimed in claim 1, the further improvement wherein the convergent optical receiving system includes terminal reflecting fractions of a diametrical strip cut out geometrically of a concave mirror, said telemeter including two pairs of photocells located adjacent spaced points of the axis of said concave mirror and of which one receives the rays reflected by one reflecting fraction and a transparent parallel sided block inserted in the path of the rays reflected by each other reflecting fraction to make them impinge on the other spaced point.

8. In a telemeter as claimed in claim 1, the further improvement wherein the convergent optical receiving system includes two separate reflecting fractions adapted to reflect separate portions of the light issuing from the object, the optical axes of said fractions extending in parallelism with a predetermined direction and wherein the separating element includes reflecting areas extending along the axes of the separate reflecting fractions and facing the corresponding fraction to reflect the rays from the latter onto the corresponding photocells, the outer edges of each reflecting area extending in a plane passing between the reflecting fractions along rectilinear lines perpendicular to the direction of the axes.

9. In a telemeter as claimed in claim 1, the further improvement wherein the convergent optical receiving system includes two separate reflecting fractions adapted to reflect separate portions of the light issuing from the object, the optical axis of said fractions extending in parallelism with a predetermined direction and wherein the separating element includes reflecting areas extending along the axes of the separate reflecting fractions and facing the corresponding fraction to reflect the rays from the latter onto the corresponding photocell, the outer edges of each reflecting area extending in a plane passing between the reflecting fractions along rectilinear lines perpendicular to the direction of the axes, the side of each reflecting area facing away from the corresponding reflecting area being black.

10. In a telemeter as claimed in claim 1, the further improvement wherein the convergent optical receiving system includes two separate reflecting fractions having different foci, adapted to reflect separate portions of the light issuing from the object, the optical axes of said fractions extending in parallelism with a predetermined direction, and wherein the separating elements include two coplanar reflecting areas each facing the corresponding reflecting fraction and separated by a transparent area, the outer edges of said reflecting areas adjacent the transparent area forming rectilinear lines perpendicular to the direction of the axes of the reflecting fractions and spaced by an amount equal to the spacing of the foci of said fractions.